July 31, 1934. J. EATON 1,968,639
MOTOR CONTROL SYSTEM
Filed July 29, 1932
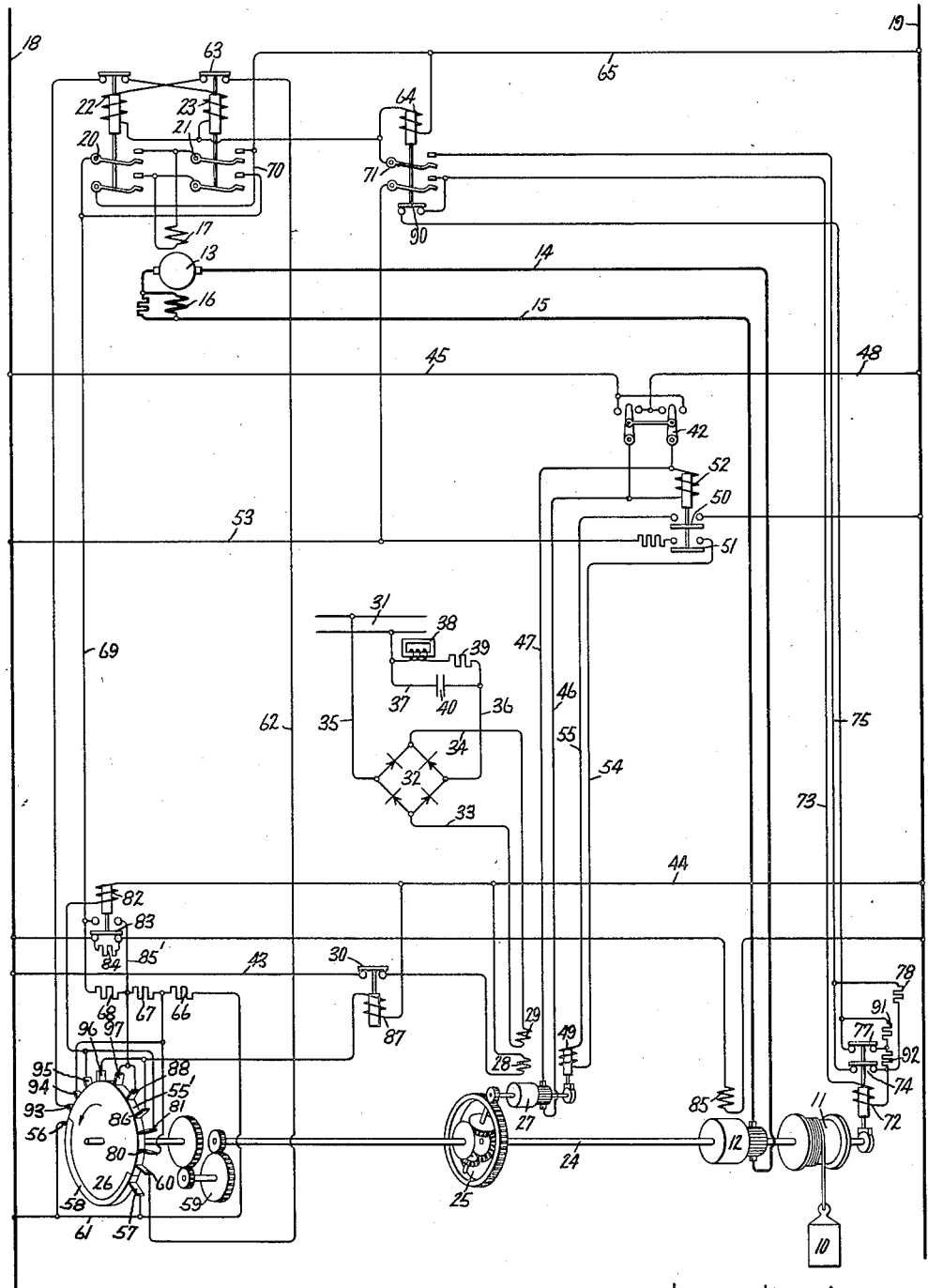
Inventor:
John Eaton,
by Charles V. Miller
His Attorney Patented July 31, 1934

1,968,639

UNITED STATES PATENT OFFICE 1,968,639

MOTOR CONTROL SYSTEM

John Eaton, Schenectady, N. Y., assignor to General Electric Company, a corporation of New York Application July 29, 1932, Serial No. 626,083

10 Claims. (Cl. 172—152)

My invention relates to motor control systems, more particularly to control systems for elevators and the like, and has for its object a system of control for maintaining predetermined speeds independently of ambient temperature changes.

One of the difficulties encountered in the operation of elevators, particularly high speed elevators, is the variations in speed incident to changes in the ambient temperature by reason of which the difficulty in making a stop is materially increased. This variation in speed from changes in the ambient temperature is due in large part to variations in resistance of the field circuit of the driving motor with consequent changes in field excitation.

My invention is particularly applicable to systems of elevator control such as described and claimed in my Patent No. 1,943,114, dated January 9, 1934, of which my present invention is an improvement. In such systems a pilot motor is provided for operating the controls for the main driving motor in such manner that the speed of the main driving motor is determined by the speed of the pilot motor. In carrying out my present invention, I provide means for maintaining the speed of the pilot motor substantially constant irrespective of ambient temperature changes. More specifically, I provide means for maintaining a predetermined field current independently of changes in the resistance of the field circuit of the pilot motor.

For a more complete understanding of my invention reference should be had to the accompanying drawing in the single figure of which is shown in diagrammatic form a system of elevator control embodying my invention.

Referring to the drawing, as previously stated my present invention has particular application to systems of elevator control such as described and claimed in my copending application previously referred to and the invention is shown as applied to such a system. Certain details of operation, such as the automatic leveling mechanism and refinements in the speed control, have been omitted, however, for purposes of clarity, my present invention being shown in connection with such systems in their elementary form. It is, of course, contemplated, however, that the system will include such refinements of leveling, speed control, etc., as the conditions of operation demand.

In the specific embodiment shown, the elevator 10 is raised and lowered through the usual winding drum 11 which is driven by a main driving motor 12. This driving motor is connected in a Ward-Leonard system with a generator 13 which is driven at a substantially constant speed by means of a suitable driving motor (not shown). The motor and generator are connected together in a permanent circuit by means of conductors 14 and 15, the circuit including a series winding 16 for the generator. The starting, stopping and direction of rotation of the motor 12 is controlled by controlling the direction and degree of energization of a shunt field winding 17 for the generator which field winding may be connected to the direct current supply mains 18 and 19 for the desired direction of excitation by means of reversing switches 20 and 21 operated respectively by the coils 22 and 23.

In addition to driving the elevator itself the main driving motor 12 is connected through a shaft 24 and the differential device 25 to a rotary controller 26. The third element of the differential 25 is driven by a relatively small pilot motor or advance motor 27 so that the rate of movement of the controller 26 is proportional to the difference in the speeds of the motors 12 and 27. The controller 26, which is disc-like in form, operates to control the energization and deenergization of the coils 22 and 23 to start and stop the motor and furthermore to control the degree of excitation of the generator field winding 17 and also the excitation of the pilot motor 27 so as to control the acceleration and deceleration of the driving motor 12.

Briefly stated, the elevator is started by starting the pilot motor 27 which operates to turn the controller 26 through the differential 25. As the motor 12 comes up to speed it offsets through the differential an increasing amount of the movement of the pilot motor and consequently the controller 26 is turned at a slower and slower rate. When the movement of the motor 12 as applied to the differential exactly offsets the movement of the motor 27, the controller comes to rest with the elevator traveling at its maximum speed. It will be observed that this speed bears a definite relation to the speed of the motor 27. Any variation in speed of the motor 12 produces a compensating movement of the controller 26 to bring its speed back to the predetermined relation with the speed of the motor 27.

In accordance with my present invention I provide means for maintaining a substantially constant field in the pilot motor 27 independently of changes in ambient temperature under certain conditions of operation. With the pilot motor speed thus independent of temperature the driving motor 12 is controlled to maintain a predetermined speed independently of temperature. As shown, the pilot motor is provided with two separately excited shunt field windings 28 and 29 each of which, it will be understood, may, and probably will, be divided into a number of sections mounted on the different poles of the motor. The motor is started with both field windings energized but in order to increase the speed of the pilot motor during acceleration the field winding 28 is deenergized by the opening of the switch 30. Thus at high speed operation the pilot motor 27 operates with the field winding 29 alone. This field winding is provided with a source of excitation which is independent of ambient temperature changes. As shown, the field winding is energized from a suitable source of alternating current 31 through a suitable two-way rectifier 32 shown as a copper oxide disc type rectifier comprising four copper oxide discs connected in a bridge circuit. The field winding 29 is connected through the conductors 33 and 34 to two points of the bridge while the other two points of the bridge are connected through conductors 35 and 36 to the source of supply 31.

Included also in the connections between the bridge and the supply source is means for maintaining a substantially constant current independently of changes in resistance of the field winding circuit such as may be caused by changes in ambient temperature. As shown, this comprises a parallel non-linear circuit comprising a saturable reactor 37 having an iron core 38 and a resistance 39 connected in series with the reactor together with a condenser 40 connected in parallel with the reactor and the resistance. Such a circuit is described in an article by C. G. Suits, entitled "Studies in non-linear circuits" in the transactions of the American Institute of Electrical Engineers, vol. 50, June 1931, pp. 724–736. As stated in the article (page 730) for a certain range of voltage which may be as large as 30% the current is substantially constant. In my system the voltage of the supply source 31 is preferably substantially constant but any change in the resistance of the circuit, including the resistance of the field winding 29, is obviously the equivalent of a change in voltage. Consequently, with the reactor, resistance and capacity so proportioned with relation to each other and to the voltage of the supply source 31 that the constant current portion of the volt-ampere curve is operated upon, the constant current will be maintained independently of any change in resistance of the field winding and field winding circuit, as well as independently of any change in the voltage of the supply circuit. In other words the current in the field winding is maintained constant over a predetermined range of variations in the relation of the voltage of the supply source to the resistance of the field winding.

The range of 30% voltage variation previously referred to, throughout which the current is maintained constant, is ample to cover by a wide margin any variation in the resistance of the field circuit or any variation in the supply circuit voltage and consequently a constant current is maintained in the field winding 29. Therefore, the pilot motor 27 has a predetermined, substantially constant field current, and therefore a substantially constant field excitation which produces a substantially constant operating speed of the motor, since the motor is preferably large enough so that the variations in its load in driving the controller 26 do not appreciably affect its speed.

It is believed now that a comprehensive understanding of the invention as well as its operation will be facilitated by a description of the operation of the system as a whole. It will be assumed that the elevator is to be started in a downward direction. To start the elevator, a manually operated switch 42, which is shown diagrammatically although it will be understood this switch may be physically similar to the usual elevator switch, is thrown in the desired direction. For the downward movement assume that the switch is thrown to the left whereby a circuit is closed for the armature of the advance or pilot motor 27. It will be understood that the field windings 28 and 29 of the pilot motor are energized at this time, the field winding 28 being connected to the supply mains 18 and 19 through the conductor 43, the switch 30 which is closed, and the conductor 44, while the field winding 29 is connected to the supply source 31 through the rectifier 32 and the parallel non-linear circuit. It will be understood that suitable disconnecting switches may be provided for the field windings although these switches are not shown. The circuit for the armature of the motor 27 may be traced from the supply conductor 18 through the conductor 45, the left-hand contact of the switch 42, conductor 46, the armature of the motor, conductor 47, the right-hand contact member of the switch 42 and conductor 48 to the supply main 19. At the same time a circuit is closed for the brake coil 49 which upon being energized withdraws the brake shoe so as to allow the armature to turn without friction from the brake, this circuit being closed through switches 50 and 51 which are operated by a coil 52 connected across the armature of the motor. This circuit for the brake coil may be traced from the supply main 18 through the conductor 53, switch 51, conductor 54, the brake coil, conductor 55, switch 50 to the supply main 19.

The pilot motor now starts and drives the controller 26 through the differential 25. As shown, the controller 26 is disc-like in form and has bearing upon its periphery a number of spaced brushes, as shown twelve in number. A certain portion of the periphery of the disc is made of electrically insulating material, as shown somewht more than one-half, so that when bearing upon this portion 55' the brushes are insulated from all conducting parts. As shown with the elevator at rest the brushes all bear upon the insulated portion with the exception of the two lowermost brushes 56 and 57 which bear upon a peripheral conducting segment 58.

At this stage the driving motor 12 is, of course, at rest, and therefore the controller 26 is driven solely by the pilot motor. It will be assumed that the controller is rotated in a counter-clockwise direction as viewed in the drawing and as indicated by the arrow. As shown a speed reducing gearing 59 is connected in the driving connection between the motors and the controller so that the controller is driven at a relatively slow speed.

With the controller rotating in a counter-clockwise direction the first step in the control is carried out when the conducting segment 58 makes engagement with the brush 60 whereby a circuit is closed from the supply main 18 through the conductor 61, brush 57, the conducting segment brush 60, conductor 62, an interlock switch 63, the operating coil 22, operating coil 64 and conductor 65 to the supply main 19. The energization of the coil 22 closes the switch 20 whereby the field winding 17 is connected to the supply mains 18 and 19 in the proper direction to cause the motor 12 to drive the elevator downward as first assumed. This circuit for field winding 17 may be traced from the supply main 18 through the conductor 61, resistances 66, 67 and 68, conductor 69, the upper switch member of switch 20, the field winding, the lower switch member of switch 20, conductor 70 and conductor 65 through the supply main 19. This gives a comparatively weak excitation of the generator since the resistances 66, 67 and 68 are in the field winding circuit whereby a low voltage is generated for starting purposes.

The energization of the operating coil 64 which, as previously observed, is connected in series with the coil 22 closes a switch 71 which closes a circuit for the brake coil 72 associated with the brake on the main driving motor 12. The circuit for the brake coil may be traced from the supply main 18 through the conductor 53, the lower switch member of the switch 71, conductor 73, the brake coil, switch 74 which is now closed, conductor 75, the upper switch member of switch 71, and coil 64 to the supply main 19. The brake coil is thus connected in parallel with the operating coil 22. When the brake coil picks up its armature to thereby retract the brake shoe and release the brake it opens the switch 74 and also the switch 77, the former switch inserting a resistance 78 in circuit with the brake coil so as to reduce its current consumption.

The main driving motor 12 now operates in a direction to lower the elevator, at the same time imparting its motion to the differential 25 in such direction that its rotation is subtracted in the differential from the rotation applied by the pilot motor 27. This slows down the controller 26 as the motor 12 comes up to speed. In the next step the conducting segment 58 engages the brush 80 and short circuits the resistance 66 thereby increasing the generator field excitation and therefore increasing the motor speed. In the next step the brush 81 is engaged whereby a circuit is closed for the coil 82 which picks up the bridging switch member 83 thus opening the short circuit around the resistance 84 in the circuit of the field winding 85 of the motor 12. This decreases the field excitation of the motor 12 and still further increases its speed.

Simultaneously with the insertion of the resistance 84 in the field circuit of the motor 12, the bridging switch member 83 is moved in engagement with its upper contacts whereby a shunt circuit is established through the conductor 85' around the resistance 68 thus still further increasing the generated voltage of the generator.

Upon continued acceleration the conducting segment 58 engages with the brush 86 whereby a circuit is established for the operating coil 87 which coil opens the switch 30 thereby deenergizing the field winding 28 of the pilot motor 27. This brings the pilot motor up to its full speed.

The last step in the acceleration of the motor, which may or may not be taken, is completed by the engagement of the conducting segment 58 with the brush 88. This short circuits the resistance 67 whereby the field winding 17 of the generator is connected directly across the supply mains 18 and 19. Preferably a stable condition of operation of the motor 12 will be taken with the segment 58 just short of engagement with the brush 88, that is, with the resistance 67 still in the circuit. This provides for stabilization in case the motor speed becomes too low in which case engagement will be made with the brush 88 to short circuit the resistance and increase the speed. In fact this regulating action whereby resistance is cut out of the circuit of the generator field winding, or cut in to decrease the speed in case it becomes higher than the speed of the pilot motor, may take place during normal operation.

When it is desired to stop the elevator, the switch 42 is thrown to its off position at the appropriate time to deenergize the pilot motor which is brought quickly to rest by the application of its brake due to the fact that the brake coil 49 is deenergized. It will be understood that the brake for this motor and also for the main driving motor 12 is applied by means of a spring but is released against the tension of the spring by means of the respective brake coil. With the pilot motor 27 brought to rest, the controller 26 is turned back since it is now driven by the main driving motor alone and the starting sequence is thereby reversed to decelerate the motor 12 and bring the elevator to rest. In the final step the conducting segment 58 of the controller disengages the brush 60 whereby the coil 22 and the coil 64 are deenergized. This allows the switch 22 to open to disconnect the field winding 17 from the supply mains and also allows the brake switch 71 to open the circuit for the brake coil 72 and at the same time close an interlock switch 90 which closes a discharge circuit around the coil 72, this circuit comprising the two resistances 91 and 92. Upon the application of the brake, the switch 77 is closed thus short circuiting resistance 91. This arrangement of the discharge circuit for the brake coil gives a predetermined gradual application of the brake to produce the desired rate of stopping of the elevator.

It will be understood that, if desired, suitable automatic leveling mechanism will be provided such as described and claimed in my aforesaid patent.

For operation of the elevator in the upward direction, the switch 42 is thrown toward the left whereby the armature circuit of the pilot motor is energized in the opposite direction for reverse rotation. The conducting segment 58 of the controller is then turned in the opposite direction, i. e., clockwise, to successively engage the brushes 93 to 97 inclusive to thereby start the motor and accelerate it for the opposite direction of rotation. It will be understood in this case that the field switch 21 is closed thereby energizing the field winding 17 of the generator in the opposite direction.

While I have shown a particular embodiment of my invention, it will be understood, of course, that I do not wish to be limited thereto since many modifications may be made, and I therefore contemplate by the appended claims to cover any such modifications as fall within the true spirit and scope of my invention.

What I claim as new and desire to secure by Letters Patent of the United States is:

1. In a system of control for an elevator, and the like, a driving motor, a controller for said driving motor, a pilot motor, means responsive to the speed of said pilot motor for operating said controller so that said driving motor is caused to operate at a speed bearing a predetermined relation to the speed of said pilot motor and means for maintaining the speed of said pilot motor substantially constant independently of changes in temperature.

2. In a system of elevator control, a driving motor for the elevator, a speed controller for said driving motor, a pilot motor, a differential connection between said controller and said motors whereby said driving motor is caused to operate at a speed bearing a predetermined ratio to the speed of said pilot motor and means for controlling said pilot motor so as to maintain its speed substantially constant independently of changes in temperature.

3. In a system of elevator control, a driving motor for the elevator, a speed controller for said driving motor, a pilot motor, a differential connection between said controller and said motors whereby said driving motor is caused to operate at a speed bearing a predetermined ratio to the speed of said pilot motor, a field winding for said pilot motor and means connected in circuit with said field winding for maintaining a substantially constant predetermined current in said field winding independently of changes in ambient temperature.

4. In a system of elevator control, a driving motor for the elevator, a speed controller for said driving motor, a pilot motor, a differential connection between said speed controller and said motors whereby said driving motor is caused to operate at a speed bearing a predetermined ratio to the speed of said pilot motor, a pair of field windings for said pilot motor, means operated by said controller for deenergizing one of said field windings to increase the speed of said driving motor and means connected in circuit with the other of said field windings for maintaining a substantially constant predetermined current in said field winding independently of changes in ambient temperature.

5. In a system of elevator control and the like, a driving motor for the elevator, a controller for said driving motor, a pilot motor, a differential driving connection between said controller and said motors whereby said driving motor is controlled by said pilot motor, means for starting and stopping said pilot motor to start and stop said driving motor, means operated by said controller for controlling the acceleration of said pilot motor, a field winding for said pilot motor and means in the circuit of said field winding for maintaining the current in said field winding substantially constant regardless of the ambient temperature.

6. The combination in a system of motor control of a motor, a field winding therefor, a source of alternating current for said field winding, and electrical connections between said source and said field winding including parallel circuit means arranged to maintain a substantially constant current in said field winding over a predetermined range of variation in the relation of the voltage of said supply source to the resistance of said field winding.

7. The combination in a system of motor control of a motor, a field winding therefor, an alternating-current source of electrical supply for said field winding, parallel circuit means including a reactor, a resistance connected in series with said reactor and a condenser connected in parallel with said reactor and said resistance, and connections between said source and said field winding including said circuit means, said circuit means being arranged to maintain a substantially constant current in said field winding over a predetermined range of variation in the relation of the voltage of said supply source to the resistance of said field winding.

8. The combination in a system of motor control of a motor, a field winding therefor, an alternating-current source of electrical supply for said field winding, a current rectifier, electrical connections between said source and said rectifier including parallel circuit means, and electrical connections between said field winding and said rectifier, said parallel circuit means being arranged to maintain a substantially constant current in said field winding over a predetermined range of variation in the relation of the voltage of said supply source to the resistance of said field winding.

9. The combination in a system of motor control of a motor, a field winding therefor, an alternating-current source of electrical supply for said field winding, a current rectifier, electrical connections between said field winding and said rectifier, and electrical connections between said source and said rectifier including means for maintaining a substantially constant current in said field winding over a predetermined range of variations in the relation of the voltage of said supply source to the resistance of said field winding.

10. The combination in a system of motor control of a motor, a field winding therefor, an alternating-current source of electrical supply for said field winding, a current rectifier, electrical connections between said field winding and said rectifier, and electrical connections between said source and said rectifier including means for maintaining a substantially constant current in said field winding over a predetermined range of variations in the resistance of said field winding.

JOHN EATON.